Figure 7:
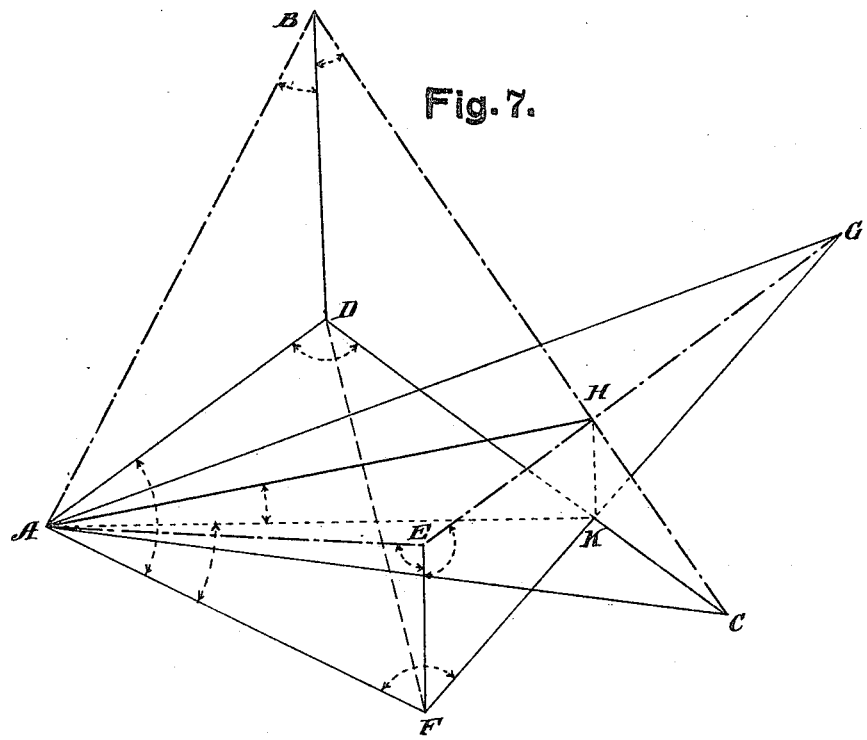

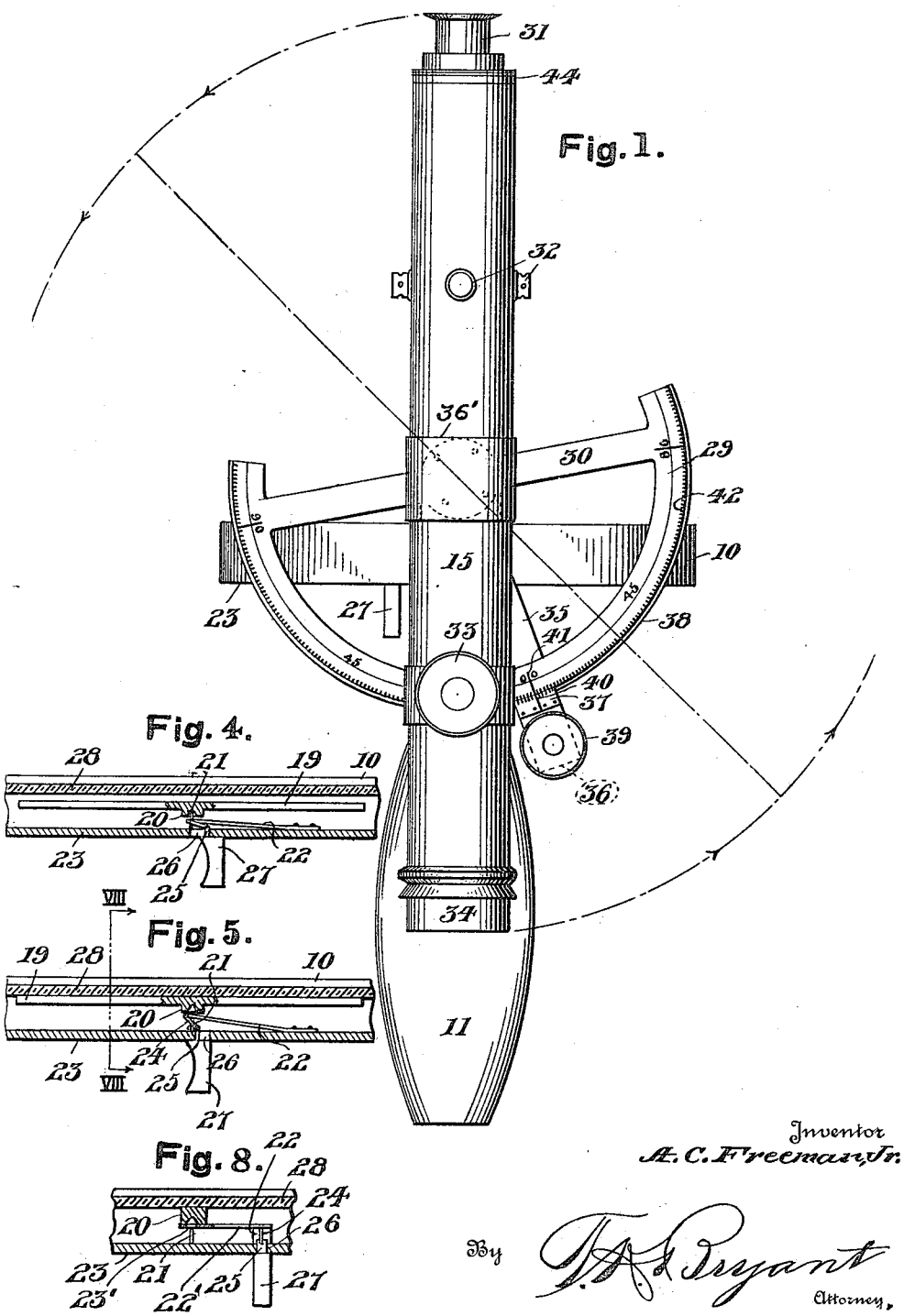

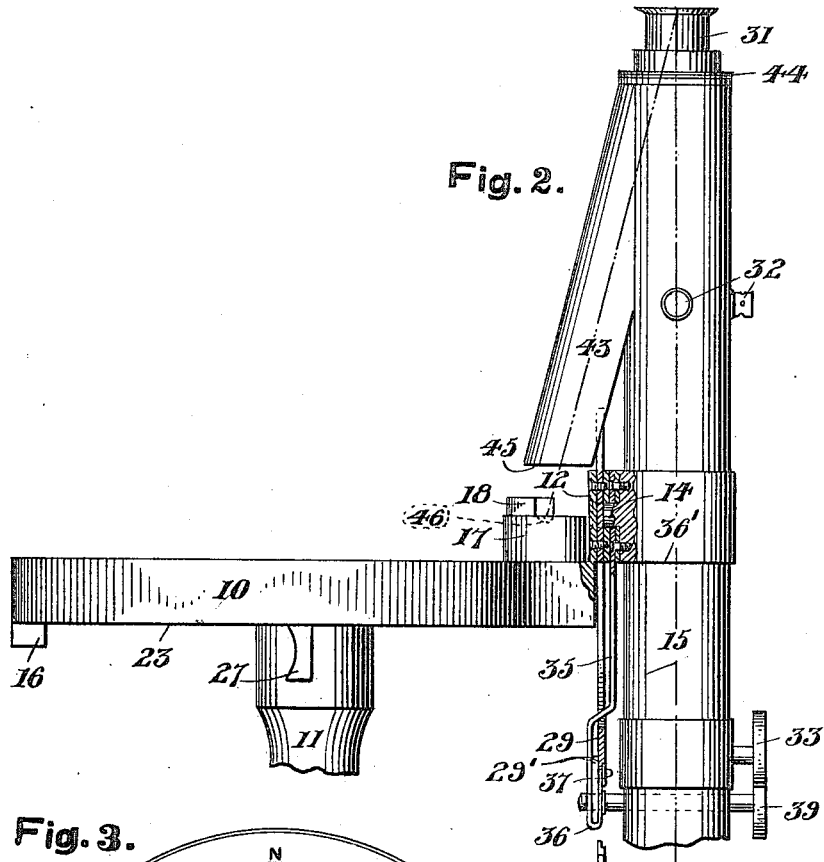

A. C. FREEMAN, Jr.
AEROTRANSIT.
APPLICATION FILED JUNE 23, 1916.

1,214,150.

Patented Jan. 30, 1917.
3 SHEETS—SHEET 3.

Inventor
A. C. Freeman, Jr.

By T. A. Bryant,
Attorney

UNITED STATES PATENT OFFICE.

ARTHUR C. FREEMAN, JR., OF NORFOLK, VIRGINIA.

AEROTRANSIT.

1,214,150.  Specification of Letters Patent.  Patented Jan. 30, 1917.

Application filed June 23, 1916. Serial No. 105,449.

*To all whom it may concern:*

Be it known that I, ARTHUR C. FREEMAN, Jr., a citizen of the United States, residing at Norfolk, in the county of Norfolk and State of Virginia, have invented certain new and useful Improvements in Aerotransits, of which the following is a specification.

This invention relates to certain new and useful improvements in aerotransits.

The primary object of the invention is the provision of an instrument for performing transit work in the air from serviceable air craft such as aeroplanes, dirigibles or balloons whereby range findings and mapping may be quickly and accurately made by my within system employing the said instrument.

A further object of the device is to provide a hand transit especially serviceable by airmen to make longitudinal determinations of geographical positions from aeroplanes, the instrument being serviceable in times of war for estimating distance ranges between the enemy's position either upon the land or water and the home base such as the battery, fort or army to which the aeroplane forms an accessory.

A still further object of the present instrument is to enable observations of the enemy's movements from an aeroplane observing vertical angles and horizontal directions and transmitting the same to the home base to be platted and in which manner the line of march may be accurately mapped out and the exact range of rifle fire upon the enemy constantly noted.

It is also possible by the aid of the present instrument to determine from the high altitude of an aeroplane accurate distances between the enemy and the home base where fog, smoke or water conditions intervene, preventing the employment of the old system of triangulation from land, my system also being serviceable when the enemy is below the horizon of the home base or is entirely hid therefrom by mountains or local land conditions.

My present system of range finding contemplates the employment of aeroplanes equipped with aerotransits, the aeroplanes to remain aloft above the range of the enemy's guns and in a position to communicate the instrument readings to the home base by means of a code of light flashes or by wireless if desired, it being unnecessary for the instrument to be located directly over the enemy, the aerotransit being operable from any position in the sky where the object such as the enemy can be observed and the readings of its direction and vertical angle with respect thereto flashed from the aeroplane to the home base. By aid of the present instrument an aeroplane is enabled to locate the enemy with sufficient accuracy for ascertaining the shooting range between the home base and the enemy, the vertical angles and horizontal directions between the enemy and aeroplane and the home base being respectively noted and the range being calculated by platting or formula.

The instrument is serviceable for night operations from an aeroplane when the location can be seen from the aeroplane even though the home base is in total darkness, recourse in such instances being had to fixed stars as a relative base.

Observations may be taken from a captive balloon, the position of the balloon having been previously established.

With these general objects in view and others that will appear as the nature of the invention is better understood, the same consists in the novel construction, combination and arrangement of parts hereinafter more fully described, illustrated in the accompanying drawings, and then claimed.

Figure 6:
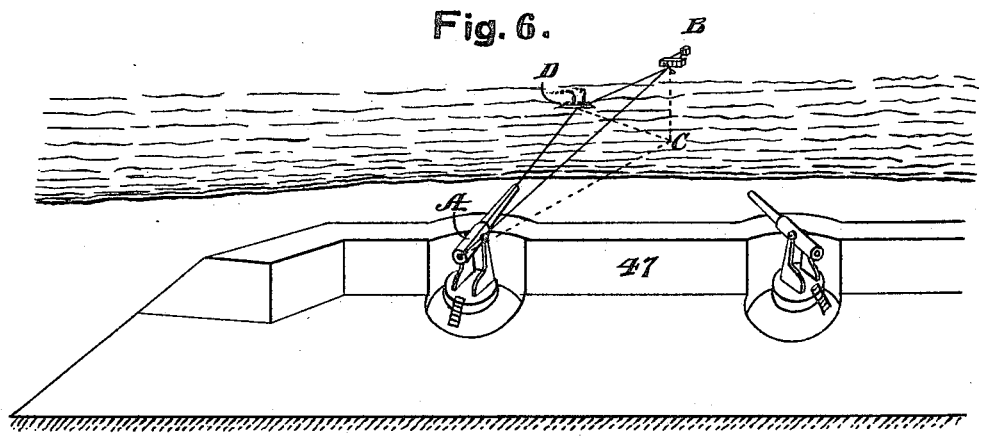

In the drawings forming a part of this application and in which like designating characters refer to corresponding parts throughout the several views:—Figure 1 is a front elevational view of the device. Fig. 2 is a side elevation thereof partially broken away. Fig. 3 is a top plan view of the same. Figs. 4 and 5 are enlarged detail sectional views of the compass showing the locking device for the needle. Fig. 6 is a view partly diagrammatical illustrating the use of the invention. Fig. 7 is a diagram illustrating a further use thereof, and, Fig. 8 is a detail sectional view upon line VIII—VIII of Fig. 5.

The device being a hand instrument adapted for service upon air craft, the same broadly consists of a circular compass box 10 having a central projecting supporting handle 11 depending from the bottom thereof, an upwardly projecting angularly arranged standard 12 being carried by a radially projecting boss 13 of the compass to which standard an axle 14 of a transit telescope 15 is revolubly journaled.

A counterweight 16 is mounted beneath the compass box 10 at the side thereof opposite the boss 13 while a circular spirit level 17 is carried upon the upper face of the compass and the said boss, a semi-circular mirror 18 being mounted upon the level 17 shiftable circumferentially thereon.

The needle 19 of the compass is centrally provided with a depending cup 20 freely seated in balanced position upon a pin 21 carried by the compass bottom 23.

A spring 22 is secured to the compass bottom 23 having an arm 22' provided with a perforation 23' through which the pin 21 extends. A link 24 connects the free end of the spring 22 with a lug 25 slidably arranged in a slot 26 of the compass bottom 23 while a trigger 27 is carried by the lug 25 outwardly of the bottom 23 and adapted to be moved by the thumb or finger of the operator when grasping the compass handle 11. It will be thus understood that the needle 19 is normally maintained in its operative position with the spring arm 22' lowered but upon forcibly removing the slide 27, the cup 20 is elevated and the needle 19 is engaged with the transparent top 28 of the compass, thus locking the needle in position for future observations of the indicated directions at a future time.

A graduated segmental scale 29 is secured to the standard 12 by means of radial arms 30, the scale being thereby held stationary with the compass 10. The telescope 15 has the usual eye piece 31, cross hair adjusting plugs 32, focusing screw 33 for the object lens and the object piece 34.

A bar 35 is fixedly secured to the axle 14 of the telescope 15 and the mounting collar 36' thereof in any desirable manner whereby the bar is mounted to revolve with the said telescope. The said bar 35 is preferably provided with a turned over free end 36 and is formed of resilient material having a vernier scale 37 secured thereto overlying the outer shouldered periphery 38 of the scale 29 and whereby the vernier 37 is maintained adjacent the scale 29 during the revoluble shifting of the telescope 15. A set screw 39 is carried by the bar end 36 for clamping the vernier 37 against the scale shoulder 38 and maintaining the telescope 15 in its adjusted position. The said vernier is provided with a scale line 40 normally coinciding with the zero line or graduation 41 of the scale 29 when the telescope 15 is vertically positioned. The scale 29 is provided with degree graduations oppositely extending from the zero line 41, ninety degrees being indicated by graduations 42 for indicating the inclination of the telescope 15 in either direction until assuming the horizontal in the plane of the compass 10. A limit block 29' is arranged in the bar end 36 between the side portions thereof.

A sight tube 43 is arranged as a branch pipe from the eye piece end 44 of the telescope, the same opening at 45 adjacent the spirit level 17 whereby visual access of the bubble 46 of the level 17 may be noted simultaneously with the taking of an observation through the eye piece 31 of the telescope.

The instrument is preferably formed of metal being light in weight and while the present embodiment of the elements is believed to be preferable, many minor changes may be made in the form of connections and other details of construction without departing from the spirit and scope of the invention.

The operation of the instrument in obtaining magnetic bearings of lines and in measuring horizontal and vertical angles will be briefly described, the theory of operation being based upon solving horizontal scalene spherical triangles by projecting horizontally a system of triangulation in vertical planes.

*For sea level observations.*—One manner of employing the instrument is illustrated in Fig. 6 of the drawings for locating the enemy's battleship D which is at sea off a coast battery 47 of the home base provided with a gun A, an aeroplane B being illustrated in the air from which observations by means of the present instrument are to be taken. It being desired to locate the position of the ship D and to secure the range of the same for the gun A, the point C is designated as the zenith point of the aeroplane B. Observations from the aeroplane B are simultaneously taken upon the home base gun A and the ship D, these observations giving the angles ABC and DBC and also the bearings BA and BD. The altitude BC is read upon the barometer with which the aeroplane is provided and the readings are signaled to the home base 47. For range finding two separate instruments are preferably employed for observing the ship D and gun by two observations at the same time. The instrument being grasped by the handle 11 and the compass 10 maintained horizontal by viewing the bubble 46 through the sight tube 43, the adjustable mirror 17 being employed if desired and the set screw 39 securing the vernier 37 against the scale 29 when the telescope 15 is brought in line with the objective object. The needle 19 is locked by means of the slide 27 by the operator at the instant the observation is taken and simultaneously with the setting of the screw 39.

Further referring to the diagram set forth in Fig. 6 of the drawings, it will be seen that in the triangle ABC, a spherical right angle triangle is presented with one acute angle and one side known, the remaining side AC being obtained by the usual formula. Consider the triangle DBC, a spherical right angle triangle with one acute DBC angle and one side BC known, therefore DC is obtained. In the triangle DCA, AC is the horizontal projection of AB and therefore has the same bearing. DC is the horizontal projection of DB and therefore has the same bearing. The angle ACD therefore is known, being given from bearings AB and DB. Therefore in triangle ADC two sides and the included angle are known so that the desired distance and direction AD are readily ascertained.

It is obvious that a single formula expressed in terms of the known angles will give the desired results quickly without platting. It will be noted that corrections may be made in allowing for the curvature of the earth such for instance, as where the ship is below the horizontal of the coast battery as well as for the travel of the aeroplane during the taking of observations in case of a single observer. By two or more observations the speed and course of the aeroplane in its travel may be obtained.

*For inland observations.*—In Fig. 7 a method is illustrated diagrammatically for determining not only the distance and bearing of the enemy but also the relative elevation of the enemy from the home base and the angle of elevation. For such determinations two separate positions must be taken by the aeroplane for obtaining separate readings from different angles upon the enemy and the home position. In the diagram shown in Fig. 7, A represents the home base, B the aeroplane in any position, H the enemy, C the line of BH at the elevation of the home base A, D the zenith point of the aeroplane B at the elevation of A, E any other position of the aeroplane relatively of the enemy H, F the zenith point of E at elevation of A, G the line of EH at elevation of A and K the zenith point of H at elevation of A.

Observations from aeroplane are made, giving the angles, ABD, DBC, AEF, FAD, DKF, and the heights BD and EF.

Consider right triangle ADB, side and acute angle known ... AD
Consider right triangle AEF, side and acute angle known .... AF
Consider right triangle ADF, two sides and included angle ... DF
    also angle ...................... ADF
    also angle ...................... DFA
Consider triangle DFK, one side and all angles known ....... FK
Consider triangle AFK, two sides and angle AFK known .... AK
    also angle ...................... FAK
Consider right triangle OHK, side GK and angle KHG known. HK
Consider right triangle AHK, side HK and side AK known ... HAK
Consider right triangle AHK, side HK and side AK known ... AH The elevation HK, the angle of elevation KAH, and the azimuth angle FAK can each be obtained from a general formula expressed in terms of the known quantities and platting be avoided.

It will be observed from a study of the two examples that the higher the aeroplane, the less will be the error of observation, also that the effect of HK in the location is less the higher the aeroplane is. At the sea level HK becomes zero and approaches G or C as a limit. For ordinary heights and work HK may be disregarded. However, the whole use of the instrument and the results it is to obtain depends upon the particular case in question.

From this detailed description of the device and its use, it will be apparent that an observer from an aeroplane may readily communicate data to the home base whereby the distance of the enemy from such a base is readily calculated regardless of the distance between the enemy and base, the contour of the intervening country or the relative altitude of the enemy and base. It will be also understood that the two diagrammatic illustrations in Figs. 6 and 7 of the drawings are only two examples illustrating serviceable uses for the present instrument, the same being innumerable and the value thereof as an aeroplane adjunct in the time of war being incalculable.

For map work in time of peace or war this instrument is highly efficient. It will be observed that the location of the aeroplane also locates the point directly beneath the same and thus the meanderings of a stream or road are quickly determined and also the path of aeroplane is platted.

While the form of the invention herein shown and described is what is believed to be the preferred embodiment thereof, it is nevertheless to be understood that various forms, modifications and arrangement of the parts may be made without departing from the spirit and scope of the invention as claimed.

What I claim as new is:—

1. An aerotransit comprising a normally-level hand compass and a telescope revolubly mounted on the periphery of the said compass.

2. An aerotransit comprising a compass, a centrally depending handle carried by the said compass, and a vertically operably positionable telescope revolubly mounted adjacent the periphery of the said compass.

3. An aerotransit comprising a compass, a centrally depending handle carried by the said compass, an operably vertically positionable telescope revolubly mounted adjacent the periphery of the said compass, a spirit level upon the said compass adjacent the said telescope, and a counterweight beneath the said compass at the opposite edge thereof from the said level.

4. An instrument for measuring vertical angles and horizontal directions comprising a hand compass having a lockable needle, a telescope revolubly positioned adjacent the periphery of said compass, an inclination designating scale carried by the said compass with the said telescope arranged at the zero indication upon the said scale when the telescope is in its vertical position with the compass positioned horizontally.

5. An instrument for measuring vertical angles and horizontal directions comprising a hand compass having a lockable needle, a telescope revolubly positioned adjacent the periphery of said compass, an inclination scale carried by the said compass with the said telescope arranged at the zero indication upon the said scale when the telescope is in its vertical position with the compass positioned horizontally, a spirit level upon the said compass adjacent the said telescope, and a setting vernier for the said scale shiftable with the said telescope.

6. An angle indicator comprising a compass, a spirit level upon the said compass, a telescope peripherally journaled upon the said compass, and a sight tube opening adjacent the said compass branching from the telescope adjacent eye piece end thereof.

7. An angle indicator comprising a compass, a spirit level upon the said compass, a telescope peripherally journaled upon the said compass, a sight tube opening adjacent the said compass branching from the telescope adjacent eye piece end thereof, an inclination denoting scale carried by the said compass, and a vernier attached to the said telescope adapted for clamping relations with respect to the said scale.

8. An angle indicator comprising a compass box, a centrally depending handle upon the said box, a radially projecting boss upon the said box, an angularly extending support at the free end of the said box, a telescope pivoted to the said support, an inclination scale of substantially 180° provided for the said telescope secured to the said support, and an adjustable vernier for the said scale carried by the said telescope.

9. An angle indicator comprising a compass box, a centrally depending handle upon the said box, a radially projecting boss upon the said box, an angularly extending support at the free end of the said box, a telescope pivoted to the said support, an inclination scale of substantially 180° provided for the said telescope secured to the said support, a resilient bar extending radially of the said scale secured to the said telescope, a vernier upon the free end of the said bar overlying the periphery of the said scale, and locking means for the vernier carried by the end of the said bar outwardly of the said scale.

10. An angle indicator comprising a compass box, a centrally depending handle upon the said box, a radially projecting boss upon the said box, an angularly extending support at the free end of the said box, a telescope pivoted to the said support, an inclination scale of substantially 180° provided for the said telescope secured to the said support, a resilient bar extending radially of the said scale secured to the said telescope, a vernier upon the free end of the said bar overlying the periphery of the said scale, locking means for the vernier carried by the end of the said bar outwardly of the said scale, a spirit level upon the said compass and boss adjacent the said support, and a sight tube for the said level communicating with the eye piece end of the telescope.

11. A device of the class described comprising a telescope, an inclination denoting scale relatively stationary during the operation of the telescope, and a normally horizontal hand supported compass in fixed relation to the said scale.

12. An angle indicator comprising a horizontally elevated compass, a telescope supported for swinging movement upon said compass about a horizontal axis, and a leveling sight tube upon said telescope whereby the level is observed simultaneously with the observing operation through the telescope.

13. An angle indicator comprising a compass, a telescope peripherally carried by the said compass for swinging movement about a horizontal axis, and a sight tube for the said level branching from the said telescope whereby the level and object to be observed are simultaneously viewable.

In testimony whereof I affix my signature.

ARTHUR C. FREEMAN, Jr.

Copies of this patent may be obtained for five cents each, by addressing the "Commissioner of Patents, Washington, D. C."